INVENTORS
ALFRED H. ROSEN
LESTER C. SMITH
BY
ROSEN & STEINHILPER
ATTORNEYS

United States Patent Office 3,714,372
Patented Jan. 30, 1973

3,714,372

METHOD AND APPARATUS FOR COUNTING AND CLASSIFYING MICROSCOPIC PARTICLES

Alfred H. Rosen, Newton, and Lester C. Smith, Newton Upper Falls, Mass., assignors to Cognos Corporation, Newtonville, Mass.

Filed June 1, 1970, Ser. No. 41,906
Int. Cl. H04n 5/76, 7/18, 9/06
U.S. Cl. 178—6.8 14 Claims

ABSTRACT OF THE DISCLOSURE

Method and apparatus for counting and classifying blood cells, including white cells, using pulses of light to form colored microscope images in a television camera. Flash lamps filtered for different spectral zones are operated in sequence to form the images, which are scanned to generate electrical signals representing properties, including color, of each image.

BACKGROUND OF THE INVENTION

This invention relates in general to counting and classifying extremely small particles, such as animal cells. It is illustrated in this specification in connection with methods and apparatus for automatically performing the differential leukocyte count in human blood samples faster and more accurately than heretofore done by hand. It will be apparent, however, that the invention is applicable to counting and classifying other constituents of blood and constituents of other body fluids and tissues, to cytological examination of cell scrapings, to the recognition of parasites in biological materials, and to counting, recognizing and classifying pollen grains in air samples, to name but a few of its potential uses. Examples are red blood cells and platelets; casts and cells found in the urine; Papanicolau (Pap) smear tests; abnormal cells of a wide variety, such as cancerous cells; and malarial carriers.

The invention employs quantitative analysis of microscope images. Prior systems exist using the combination of a microscope and a television camera which scans the microscope image to provide electrical signals for processing to yield particle-measurement information. Examples of such prior systems are described in "Laboratory Management," January 1970, pages 22 to 25, inclusive. The illustrated example of the present invention employs a similar combination of microscope and television camera in a new way.

A system for recognizing and classifying different types of blood cells is disclosed in U.S. Pat. No. 3,315,229, Smithline, wherein five types of white cells are illustrated as stained by Wright's Stain, along with red cells and platelets. That system requires first means for interrogating a cell (i.e.: determining the peripheral length of the cell) for its shape and/or size, and second means for interrogating the cell (i.e.: scanning across it) to detect the colors of the cell when the cell is stained to produce characteristic colors of cytoplasm and nucleus, for example. A single broadband source of light (in the form of a flying spot scanner) is used. Color filters in light paths from the sample cell to individual photodetectors serve to distinguish preselected spectral zones. A similar lighting technique, employing a single broadband source of light, is used in U.S. Pat. No. 3,497,690 to Wheeless, Jr. et al., for classifying biological cells by measuring their size and fluorescent response.

In the present invention, automated analysis of small particles, particularly biological cells such as blood cells, is performed in a simplified manner with pulses of light forming a sequence of microscope images of the particle or cell under examination. Each image is individually scanned to generate the desired information about the particle or cell. According to the method of the invention, the light pulses can be uniquely colored in a desired sequence. Apparatus for practicing the invention can employ flash lamps of readily available varieties, under control of known and reliable electronic circuits for operation in a desired sequence. The detection of platelets, red cells, and differential counting of white cells are all facilitated in a new and simplified manner.

Use of a microscope fitted with a movable stage is facilitated with the motion-stopping properties of flash lamps. Thus, if a biological specimen is supported on a stage which is in continuous motion transverse to the optical axis of the microscope, illumination of the specimen with a series of light flashes of appropriate duration and intensity can provide a series of microscope images that are acceptably the same as images taken with the stage moved step-wise and the specimen standing still for each light flash. Of course, the velocity of continuous motion should be within the limit at which the specimen would move so far during the flash duration as to produce an undesirably smeared image.

DESCRIPTION OF THE INVENTION

An embodiment of the invention is described in the following specification with reference to the accompanying drawings in which.

Figure 1:
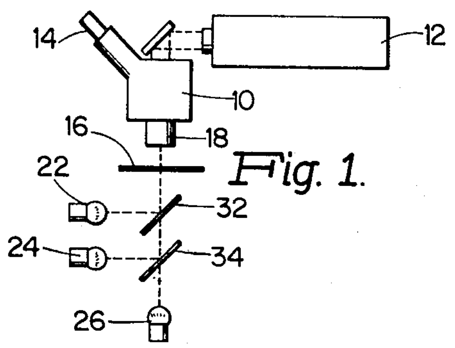
FIG. 1 represents a microscope combined with an electronic-image device.

In FIG. 1, a microscope 10 is mated to a television camera, such as a vidicon 12. An eye-piece 14 is retained to permit visual observation of an object (not shown) on the stage 16 under the objective lens 18. Three light sources 22, 24 and 26 are provided for trans-illumination of the object. The light sources may be selectively energized (as described below). Each light source provides illumination in a unique frequency band, such as red, green or blue. The illustration of three light sources is exemplary only. Any desired number may be employed. Moreover, illumination in the infra-red or ultra violet may be employed, if desired. In this specification, the example chosen to illustrate the invention will use red, green and blue light sources as examples. Dichroic mirrors 32 and 34 are used in well-known fashion, to relay the light from each light source to the stage 16. While the stage and light sources are illustrated for transillumination, it will be understood that reflective illumination may be employed, if desired. As will become apparent, the invention advantageously uses strobe lamps, similar to those used in flash photography, as the light sources 22, 24 and 26.

Figure 1A:
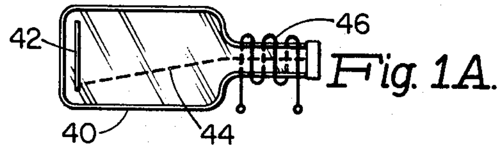
FIG. 1A illustrates an image-scanning tube.

The vidicon 12 is controlled to scan the microscope field in a pattern or raster of lines, as in television. It thus employs a series of "horizonatl" scansions, to fill in a single frame, and at the end of each frame its scanning beam is "vertically" retraced to the starting point for the next frame. FIG. 1A schematically illustrates this well-known process. A target 42, on which the optical image is focused by the microscope is contained within an envelope 40 containing means (not shown) to provide an electron beam, represented by a washed line 44. A coil 46 at the neck of the envelope represents the beam-focusing and scanning components of the vidicon. Since these components are well-known, a working arrangement of them is not illustrated.

Figure 2:
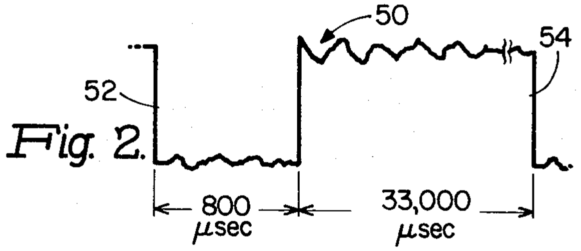
FIG. 2 shows a train of control pulses.

FIG. 2 shows a usual train 50 of vertical blanking and unblanking pulses 52, 54 respectively. During the time interval when the scanning beam 44 is scanning the target 42, a voltage pulse 54 that permits the electron beam to reach the target is applied to the vidicon. During the vertical retrace interval, a voltage pulse 52 that prevents the electron beam from reaching the target is applied to the vidicon; this is known as the vertical blanking interval, or pulse. In the system of television currently in use in this country, the vertical blanking interval is about 800 microseconds, while the scanning interval is about 33,000 microseconds.

According to the present invention, it is preferred to flash the lamps 22, 24 and 26 during the vertical blanking interval. More particularly, a first one of the lamps 22 is flashed during the blanking interval preceding a first frame, a second lamp 24 is flashed during the blanking interval preceding the next frame, and the third lamp 26 is flashed during the blanking interval preceding the third frame, and then this cycle is repeated, as desired. In this way, a sequence of differently-colored images of an object is formed with a sequence of pulses of light of different color values, and the color information is obtained with a single black-and-white vidicon tube.

The target 42 need not be continuously illuminated during scansion in order to provide electrical signals for television purposes. All that is required is that sufficient light coulombs impinge on the target to store the image, and this can be done as well with a high intensity light source turned on for a short time interval as with a low intensity light source turned on for a longer time interval, or continuously. Photo-strobe light sources are available which can provide adequate light on the target 42 in short time intervals. Indeed, such sources are preferred in the present invention for their motion-freezing properties, enabling use of the present invention with objects in motion across the microscope field.

Figures 3, 4:
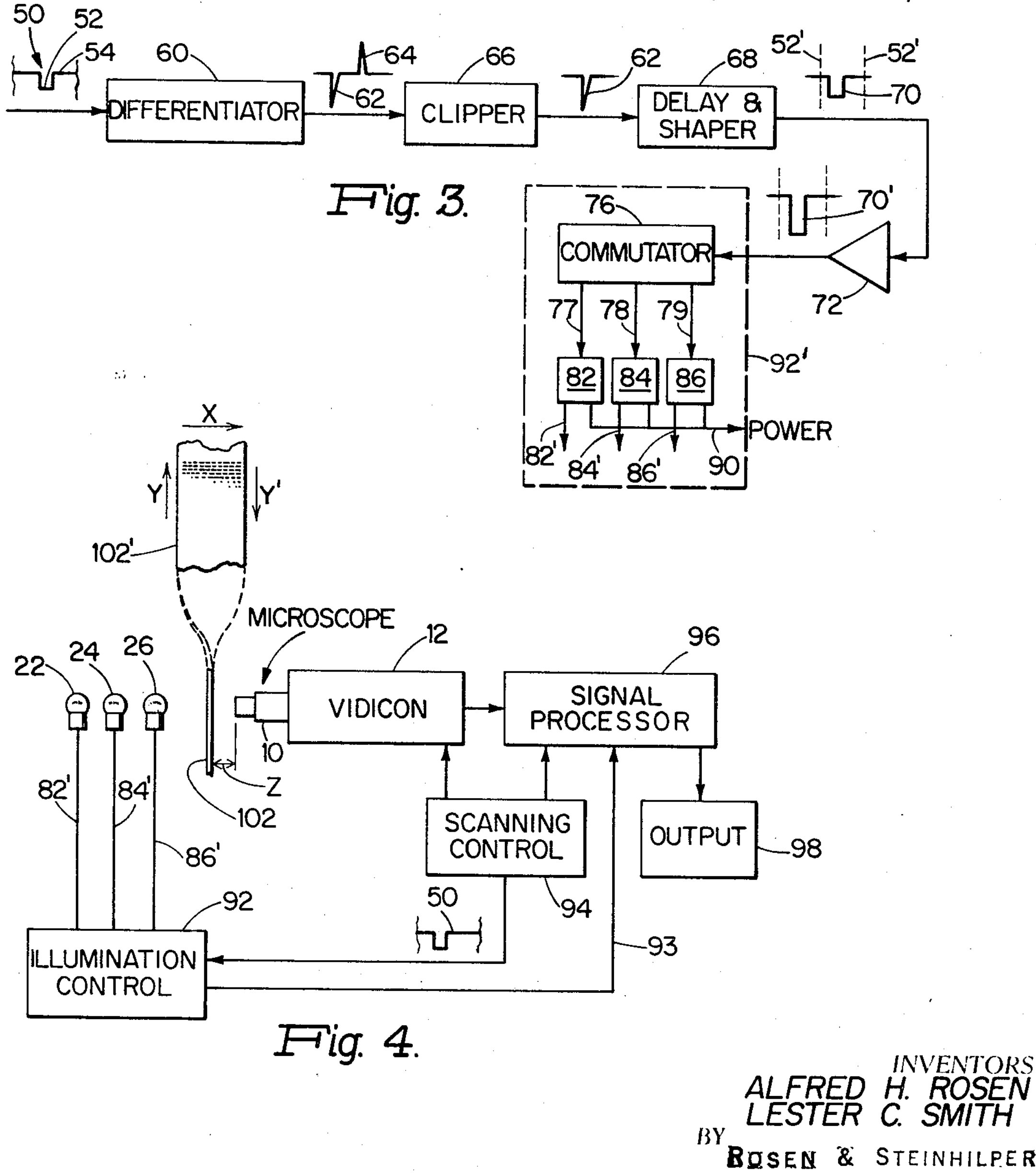
FIG. 3 is a schematic diagram of an illumination control circuit.
FIG. 4 is a schematic diagram of a particle counting system according to the invention.

FIG. 3 schematically illustrates an illumination control circuit. The train 50 of vertical blanking and unblanking pulses is applied to the input of a differentiator 60, which provides at its output a negative-going pip 62 corresponding in time to the leading edge of the vertical blanking pulse 52, followed by a positive-going pip 64 corresponding in time to the leading edge of the vertical unblanking pulse 54. These pips are passed through a clipper 66 which clips the positive-going pip 64. The negative-going pip 62 is then passed through a delay and shaper network 68, which may comprise a multivibrator of known form (not shown), the output of which is a negative-going pulse 70 occurring part-way in the vertical unblanking interval, represented by vertical dashed-lines 52'. This is the illumination control, or flash-sync. pulse. If desired, it may be amplified in an amplifier 72, the output of which is an amplified flash-sync. pulse 70'.

In order to flash the light sources 22, 24 and 26 in the desired sequence the flash-sync. pulse 70 must be applied to them one at a time, in the desired sequence. A commutator 76 is provided for this purpose. Any suitable commutator may be used. A ring counter (not shown) is particularly suitable, being self-synchronous by nature. The ring counter in this case will have three stages, or bistable devices, which may be connected in a closed-ring configuration. Such devices are described in "Arithmetic Operations in Digital Computers"; Richards, R. K.; pages 205–208; Van Nostrand 1955. As is wellknown, a ring counter will act in response to an input pulse to shift a data bit from one stage to the next; thus each time a pulse 70 (or 70') is applied to it, the commutator 76 will provide an output at one only of its output terminals 77, 78 and 79. Flash-control units 82, 84 and 86, for light sources 22, 24 and 26, respectively, are connected to terminals 77, 78 and 79, respectively. These units may be similar to the charged-storage-capacitor type flash-control units used in flash-photography, and a source of power (not shown) is provided to them via a power line 90. Each flash-control unit is connected to its respective light source via a line 82', 84' or 86', respectively.

An operative system according to the invention can be assembled according to FIG. 4. A scanning control unit 94, which provides the usual electrical signals to control the vidicon 12, is connected also to the illumination control 92 (FIG. 3) to which it supplies the train 50 of vertical blanking and unblanking pulses, and to the signal processor 96, to which it supplied the same information that it supplies to the vidicon, so that each bit of information fed into the signal processor from the vidicon can be identified with a particular location in the field of view. The object 102 under view is located a distance Z from the microscope objective lens. It may be held still, or it may be moved continuously or step-wise in the Y direction. Its image referred to vidicon target 42, as represented in plan at 102', is scanned "horizontally" in the X-direction, and "vertical" deflection of the scanning beam 44 is in the Y' direction. The electrical signals generated by the vidicon are fed to the signal processor 96. Each time a new frame is started, the leading edge of the unblanking pulse 54 so informs the processor. Aline 93 from the illumination control enables the illumination control 92 to "tell" the signal processor 96 which light source 22, 24 or 26 was energized to store the optical information that is about to be scanned, so that the signal processor will "know" the "color" of the scene being scanned.

Since the details of information processing form no part of the present invention, the signal processor is not discussed further. An output 98, suitable to the purpose of the system, will in any case be provided. It is appropriate, however, to discuss a feature of the invention as related to hematology.

Human blood contains red cells, white cells and platelets, among other things. White cells occur in five principal normal varieties or types, each of which has a nucleus surrounded by cytoplasm. Normal red cells resemble each other quite closely, as do platelets. The present invention enables all of these various cells to be counted and distinguished one from the other. In clinical language, the present invention enables the automation of the differential leukocyte count, as well as the red cell and platelet counts. The use of color as disclosed is unique in its mode of application.

When a slide bearing a sample of human blood stained with Wright's stain is transilluminated with green light of wavelength in the range of about 50–550 nanometers, hemoglobin and the cytoplasm of white cells become substantially totally transparent, and the white cell nuclei and the platelets stand out in sharp contrast from the background; moreover, the platelets are so different from the white cell nuclei, both in size and shape, that it is a simple matter to tell them apart—the probability of confusion is virtually nil. On the other hand, when the same slide is transilluminated with blue light of wavelength in the range of about 440 to 450 nanometers, the red cells and the white cells become about uniformly translucent, or somewhat opaque, to the same degree; the white cell nuclei cannot be distinguished from the cytoplasm, so that only the outline of the white cells appears; the platelets become essentially transparent. Thus information from two successive "views" of the same field on a slide, one in green light and one in blue light of respective appropriate wavelengths, will positively identify white cell nuclei and platelets, and the sizes of white cells and red cells with a minimum of confusion or error as to what the data means. Since each element in the field of view can be readily identified as to its location in the field, it is a simple matter to match white cell nucleus and size data obtained on two successive views of the same field.

Vidicon tubes 12 exist having targets 42 which will store an optical image until the target is scanned by the electron beam 44, and in which the beam erases the image as it scans the target. A vidicon having these properties is preferred for use in the present invention. Illumination of the stage 16 can be done with pulses from a single source of light (i.e.: one strobe lamp) working with a black-and-white camera tube fitted with a rotatable color filter synchronized with the frames and light flashes, generally as in field-sequential color television systems, rather than with three separate flash tubes as in the illustrated embodiment. In any case, the subject on the stage will be illuminated with a pulse of light, the motion-freezing properties of which will not only facilitate the use of a moving or movable stage, but will also minimize the adverse effects of vibration in the system. Vibration can have adverse effects on the ability to maintain sharp images, without motion-induced blurring, especially if the microscope is used at high magnifications, such as 1000×.

In the illustrated embodiment the strobe lamps may be white when used with dichroic mirrors as shown, since the dichroic mirrors are themselves frequency-selective. On the other hand, the strobe lamps may be individually filtered, in which case part-silvered mirrors may be substituted for the dichroic mirrors 32 and 34, respectively.

The signal processor 96 includes, or will have associated with it, provision or means (not shown) to store the signals which are supplied to it. Systems according to the invention are, of course, not limited to scanning vidicon 12 at any particular line or frame rate, or for that matter in the mode that is illustrated.

Other embodiments and modifications of the invention will occur to those skilled in the art. It is intended that this invention includes all modifications and equivalents which fall within the scope of the appended claims.

We claim:

1. In the analysis of microscopic particles of different types, a method for recognizing a plurality of different parameters of each particle, for classifying a large quantity of such particles by type, comprising the step of: repeatedly illuminating each of the particles with a sequence of light pulses, forming an image of the particle with each light pulse, the pulse of light thereby forming a sequence of a plurality of images of each particle, separately scanning each of the plurality of images, and producing a separate data output from each sequentially scanned image, each data output capable of representing at least one of the particle parameters.

2. The method according to claim 1 in which said step of scanning comprises the separate scanning of each sequential image in a normal raster mode.

3. The method according to claim 2 further including the steps of forming by said raster scanning an element-by-element pattern of each of the plurality of images of a particle to thereby define the data for readout, storing each of the resulting plural patterns representing a particle, and assigning to each pattern element an address for locating same for subsequent data processing.

4. The method according to claim 1 further comprising the step of generating each pulse of said sequence of light pulses with a different color value.

5. The method according to claim 4 in which said step of illuminating comprises transilluminating the particles each with at least a pulse of green light approximately in the wavelength of 540–550 nanometers, and a pulse of blue light approximately in the wavelength of 440–450 nanometers.

6. In the analysis of microscopic particles of different types, apparatus for recognizing a plurality of different parameters of each particle, for classifying a large quantity of such particles by type, said apparatus comprising: means for repeatedly illuminating each of the particles with a sequence of light pulses, means for forming an image of the particle illuminated by each light pulse, said image forming means thereby forming a sequence of a plurality of images of each particle, means for separately scanning each of the plurality of images, and means for producing a separate data output from each sequentially scanned image, each data output capable of representing at least one of the particle parameters.

7. Apparatus according to claim 6 in which said illuminating means includes light control means operative to pulse illumination onto a particle in the time interval between the end of the scanning of one of its said images and the start of scanning of the next in said sequence of its images.

8. The apparatus according to claim 6 in which said means for scanning comprises raster mode scanning means for the separate scanning of each sequential image in a normal raster mode.

9. The apparatus according to claim 8 in which said raster mode scanning means includes means for forming by said raster scanning an element-by-element pattern of each of the plurality of images of a particle to thereby define the data for readout, said apparatus further comprising means for storing each of the resulting plural patterns representing a particle, and means for assigning to each pattern element an address for locating same for subsequent data processing.

10. The apparatus according to claim 6 further comprising means for generating each pulse of said sequence of light pulses with a different color value.

11. The apparatus according to claim 10 in which said illuminating means comprises means for transilluminating the particles each with at least a pulse of green light approximately in the wavelength of 540–550 nanometers, and a pulse of blue light approximately in the wavelength of 440–450 nanometers.

12. Apparatus according to claim 10 in which said illuminating means includes light control means operative to pulse illumination onto a particle in the time interval between the end of scanning one of its images in said sequence, and means for cyclically repeating said sequence of light pulses of different color value for each particle to be scanned.

13. The apparatus according to claim 12 in which said means for scanning comprises raster mode scanning means for the separate scanning of each sequential image in a normal raster mode, said raster mode scanning means includes means for forming by said raster scanning an element-by-element pattern of each of the plurality of images of a particle to thereby define the data for readout, said apparatus further comprising means for storing each of the resulting plural patterns representing a particle, and means for assigning to each pattern element an address for locating same for subsequent data processing.

14. Apparatus according to claim 13 including data processing means for receiving and processing said data output, and means coupling said light control means to said data processing means for supplying color value data to said data processing means to enable separate particle parameter analysis for the particle type classification.

References Cited

UNITED STATES PATENTS

| | | | |
|---|---|---|---|
| 2,731,202 | 1/1956 | Pike | 178—DIG 1 |
| 3,390,229 | 6/1968 | Williams | 178—DIG 1 |
| 3,315,229 | 4/1967 | Smithline | 340—146.3 |
| 3,275,744 | 9/1966 | Dietrich | 178—DIG 1 |
| 3,111,555 | 11/1963 | Dkyeman et al. | 178—DIG 1 |
| 2,010,307 | 8/1935 | Leishman | 178—5.2 R |

HOWARD W. BRITTON, Primary Examiner

U.S. Cl. X.R.

178—DIG 1, DIG 36, DIG 37; 235—92 PC; 356—39

PO-1050
(5/69)

Patent Attorneys' Supplies Divis
Pengad Publishers, Bayonne, N

UNITED STATES PATENT OFFICE
CERTIFICATE OF CORRECTION

Patent No. 3,714,372 Dated January 30 1974

Inventor(s) A. H. Rosen et al.

It is certified that error appears in the above-identified patent and that said Letters Patent are hereby corrected as shown below:

Column 2, line 63. change "horizonatl" to --horizontal--; line 70. change "washed" to --dashed--. Column 4, line 50, change "50-550" to --540-550--. Column 5, line 38, change "step" to --steps--; line 41. change "pulse" (second occurence) to --pulses--

Signed and sealed this 19th day of November 1974.

(SEAL)
Attest:

McCOY M. GIBSON JR.
Attesting Officer

C. MARSHALL DANN
Commissioner of Patents